Jan. 10, 1956
H. C. SAVINO
2,730,300
PRODUCTION DEVIATION COMPUTER
Filed March 17, 1953
2 Sheets-Sheet 1
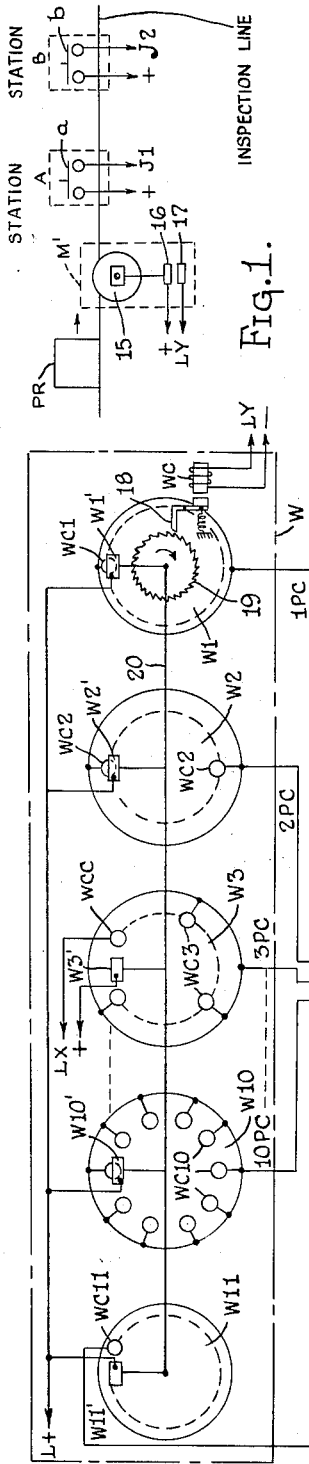
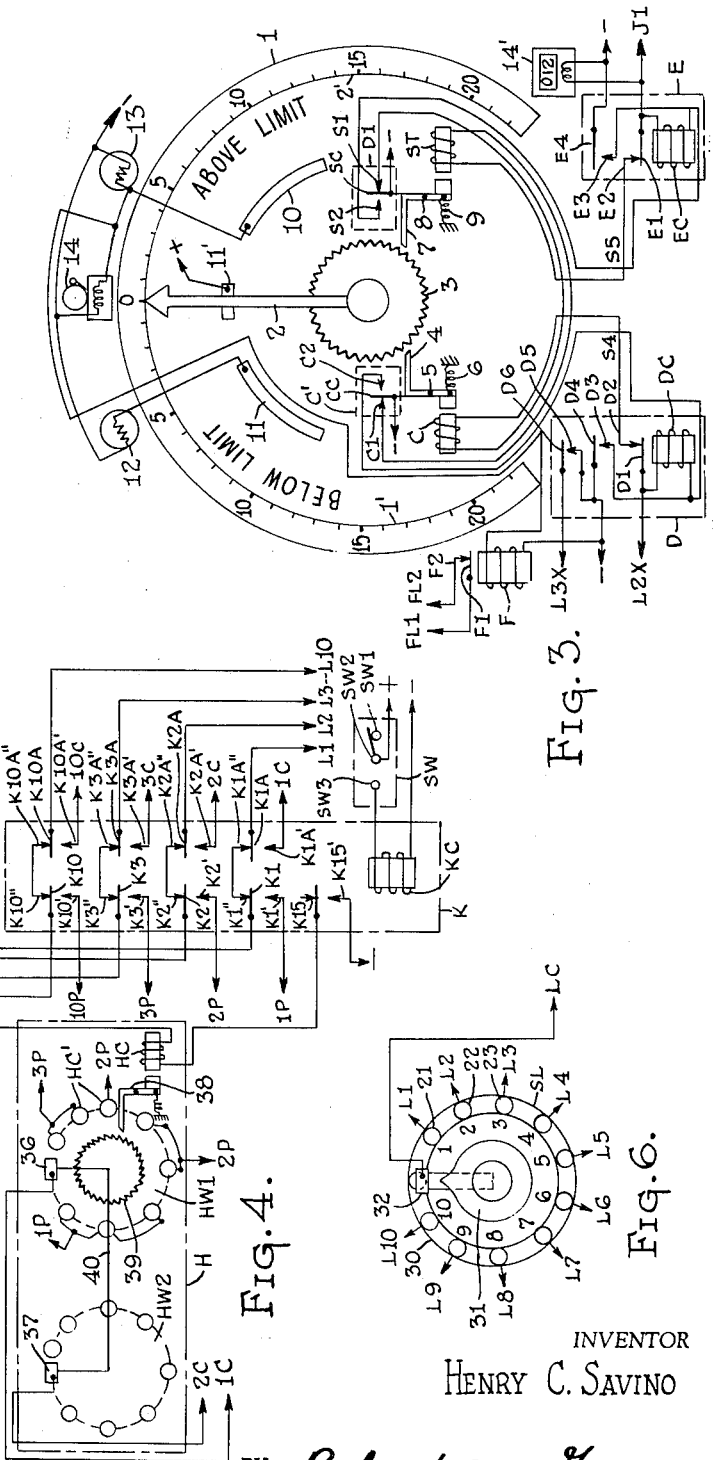
INVENTOR
HENRY C. SAVINO
BY Richards & Geier
ATTORNEYS Jan. 10, 1956 H. C. SAVINO 2,730,300
PRODUCTION DEVIATION COMPUTER
Filed March 17, 1953 2 Sheets-Sheet 2
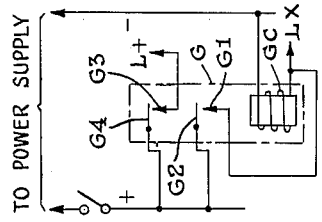
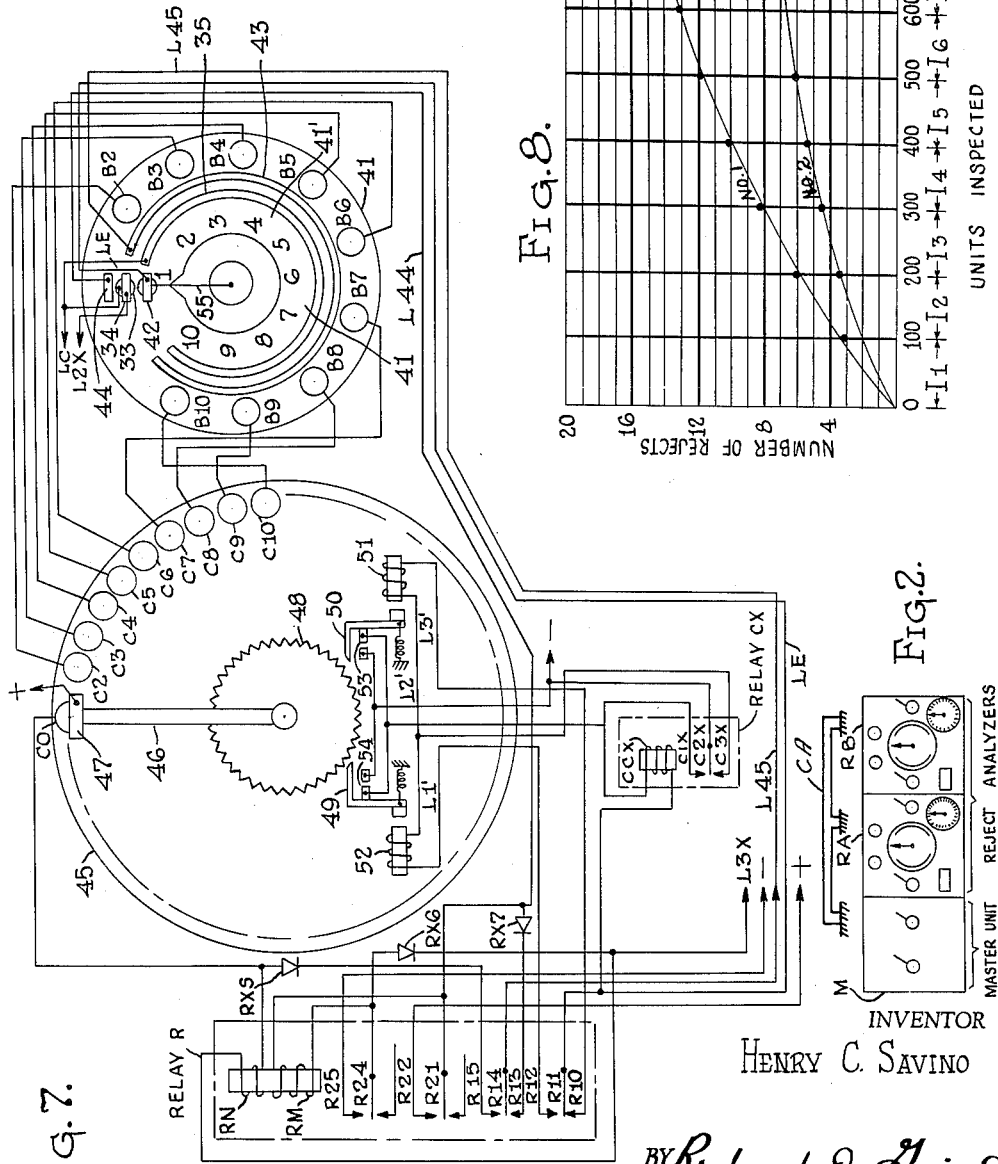
INVENTOR
HENRY C. SAVINO
BY Richards & Geier
ATTORNEYS

United States Patent Office 2,730,300
Patented Jan. 10, 1956

2,730,300
PRODUCTION DEVIATION COMPUTER

Henry C. Savino, Hackensack, N. J.

Application March 17, 1953, Serial No. 342,870

15 Claims. (Cl. 235—61)

This invention relates to computing and indicating systems and refers more particularly to an apparatus for use in manufacturing plants for indicating deviations from a pre-set reject level of production.

The present application is a continuation in part of my copending patent application, Ser. No. 264,863, filed Jan. 4, 1952, now Patent No. 2,679,355.

The general practice in industry to determine whether production rejects exceed a predetermined level is to have assigned personnel gather the reject information at the various inspection stations at intervals, take this data and make the necessary calculations to determine whether the actual rejects are above or below a pre-set reject level. This method is slow and costly, and results in unnecessary rejects since by the time the information is gathered and computed much time elapses before the source of excessive rejects is located. This method is further complicated when the pre-set reject level follows a probability curve. Therefore, an object of the present invention is to create a computing and indicating system, which provides a continuous and accurate indication of the actual reject level at the various inspection stations.

Another object of the present invention is the provision of a computing system which will continuously and automatically compute and indicate deviations from a pre-set reject level of production in manufacturing plants irrespective as to whether it be based on a straight percentage basis or a probability curve basis.

A further object is the provision of an automatically operable indicator which will continuously indicate quantitatively the amount of deviation from a pre-set reject level of production.

Yet another object of the present invention is the provision of a computing system which will compute and indicate the quality level of production in terms of reject deviations from a pre-set reject level.

Yet another object is to increase the range of the reject level selection through the provision of a flexible electrical impulse divider.

A still further object of the present invention is the provision of automatically operable means for turning off a production machine when the deviation rejects reach a pre-determined amount.

Yet another object is the provision of a visual and audible system informing an inspector, supervisor, foreman or the like, that a pre-determined reject deviation has reached a critical point.

Another object of the invention is the provision of a computing and indicating system which may include any number of inspected characteristics of a product.

A further object is to increase the accuracy of computing and indicating systems operated by electrical impulses.

A still further object of the present invention is the provision of a master unit that emits impulses representing the pre-set reject level for any number of inspected characteristics of a product.

Other objects of the present invention will become apparent in the course of the following specification.

In attaining the objects of the present invention it was found desirable to provide an off-limit indicator comprising one dial and a single hand movable over the dial. The dial is divided into a section which indicates "below limit" and another section which indicates "above limit". When the hand is in the "below limit" section it indicates that the actual rejects are below the pre-set reject level, while when it is in the "above limit" section, it indicates that the actual rejects have exceeded the pre-set reject level, so that corrective action should be taken. The hand is movable in opposite directions by impulses transmitted electrically from two different sources. One of these sources emits signals in accordance with the pre-set reject level while the other source emits impulses according to the actual number of rejects. The hand on the dial indicates the difference between the two signals according to the following equation:

$$RD = AR - PR$$

wherein:

RD represents the reject deviations
AR is the actual number of rejects
PR is the pre-set reject level Impulses representing the pre-set reject level are emitted by a stepping mechanism and may be set to be emitted either on a straight percentage basis, or a probability curve basis. The actual number of rejects may be represented by impulses which emanate from a push-button contact, a micro-switch, a photoelectric unit, or any other suitable means.

When the system is used on a straight percentage basis the above equation becomes:

$$RD = AR - (AP \times UI)$$

Where:

AP is the pre-set allowable reject percentage, and
UI is the number of units inspected.

When used on a probability curve basis the equation becomes:

$$RD = AR - (P_1 \times I_1 + P_2 \times I_2 + P_3 \times I_3 + \ldots)$$

Where:

$P_1$, $P_2$, $P_3$ etc. represent the pre-determined reject percentages for the various increments of inspected units.
$I_1$, $I_2$, $I_3$, etc. represent the various increments of inspected units and are associated with the percentages $P_1$, $P_2$, $P_3$, etc.

The two equations are embodied in the apparatus wherein they are represented by electrical impulses.

The invention will appear more clearly from the following detailed description when taken in connection with accompanying drawings showing by way of example only, preferred embodiments of the inventive idea.

In the drawings:

Figure 1 is a diagram showing the general layout of an inspection line and its associated inspection stations.

Figure 2 is a diagram illustrating a master impulse emitter unit and a number of reject analyzers.

Figure 3 is a diagram showing an off-limit indicator.

Figure 4 is a diagram illustrating the master impulse emitter.

Figure 5 is a diagram showing the power supply and an associated electrical relay.

Figure 6 is a diagram showing a reject level selector used to select the pre-set level of the reject analyzer.

Figure 7 is a diagram illustrating an impulse divider and the divider selector associated therewith.

Figure 8 illustrates reject probability curves.

A typical inspection line shown in Figure 1 comprises a counter M' and inspection stations A and B.

Obviously there may be more or less inspection stations, depending on the number of characteristics that a product is inspected for.

A product PR may be inspected for color uniformity, workmanship, dimensions, etc. Counter M' counts the number of units that have been brought for inspection. At each inspection station a reject button is provided so that each time a particular characteristic does not meet the requirements the reject button is depressed.

Whenever the inspection is carried out by automatic means, the reject button may be depressed automatically. A master unit shown in Figure 2 may be provided with any number of reject analyzers, the number depending on the number of characteristics that a product PR is inspected for. In the example shown in the drawings, a product PR is inspected for two characteristics, so that two reject analyzers RA and RB operate with the master unit M. The master unit M is associated with the counter M' and produces electrical impulses representing the preset reject level for reject analyzers RA, RB. A reject pushbutton $a$ is associated with the analyzer RA and provides electrical impulses representing the actual number of rejects occurring at the station A. A push-button $b$ is associated with the reject analyzer RB and provides electrical impulses representing the actual rejects at station B. The master unit M produces the pre-set reject level impulses and transmits them to analyzers RA, RB by means of a plug cable CA. Each analyzer has a deviation indicator, such as the one shown in detail in Figure 3, and provides a supervisor of quality control with continuous indications of the reject level at stations A and B.

The indicator or reject analyzer RA, showing the deviations, is illustrated in Figure 3 and consists of a single dial 1 divided into a "below limit" portion 1' and an "above limit" portion 2'. In the example illustrated, the "below limit" portion 1' occupies the left helf of the dial (looking in the direction of Figure 1) while the "above limit" portion 2' occupies the right half of the dial. A clock-like hand 2 sweeps over both halves of the dial 1. The hand 2 is firmly connected to a gear wheel 3. The wheel 3 is moved stepwise, counter-clockwise by means of a pawl 4 which is pivoted at 5 and which is held in its retracted position by means of a spring 6. The pawl 4 is actuated by a coil C.

It is apparent that when the coil C is actuated, the pawl 4 will be swung about its pivot 5 and will move counter-clockwise the wheel 3 and the hand 2 connected therewith.

A second pawl 7 is located opposite the pawl 4 and is used to move the hand wheel 3 and the hand 2 connected therewith in the opposite direction, namely clockwise. The pawl 7 is pivoted at 8 and is held in the retractable position by the spring 9. The pawl 7 is actuated by coil ST.

Thus in the example illustrated, the hand 2 is actuated counter-clockwise by impulses due to a pre-set reject level and is actuated clockwise by impulses due to the actual number of rejects. It is apparent that this arrangement may be reversed if desired.

The common contact CC of a single pole double-throw switch C' is connected mechanically to the pawl 4 and actuates the switch C' when the pawl 4 rotates about the pivot 5 to engage the stepper wheel 3. The switch C' performs a dual operation, namely, it opens the circuit to the negative side of stepping coil ST by opening the normally closed contact CC—C1, so that coil ST cannot be energized at the same time that the coil C is energized; it also acts to insure that the impulse power to the coil C is of duration just sufficient to perform the stepping operation. This is done by the closing of contacts CC—C2 each time the pawl 4 moves the wheel 3 one step, at which time the circuit to the negative side of coil DC of relay D is completed. It will be noted that the coils DC and C are both connected to line L2X which feeds the impulse power from the master unit to these coils, as will be explained in detail hereinafter.

Energization of the relay D operates the contacts D1—D2, D3—D4, D5—D6. The opening of the contacts D1—D2 interrupts the circuit between the line L2X and the line S4 of coil C, thus deenergizing the coil C. The closing of contacts D3—D4 provides a holding circuit to the negative side of coil D, so that although the contacts CC—C2 open by the action of spring 6 when the coil C is de-energized, the coil DC remains energized until the time when the impulse power to line L2X is interrupted. The closing of contacts D5—D6 performs a function in connection with the impulse divider of Figure 7 which will be described hereinafter.

The pawl 7 of Figure 3 carries a common contact SC of a single pole double-throw switch D' in a manner similar to that of pawl 4. Each time the pawl 7 moves to engage the stepper wheel 3, contacts SC—S1 open and contacts CS—S2 close. The opening of the contacts SC—S1 opens the circuit to the coil C so that while the coil ST is energized the coil C cannot be energized. The closing of contacts SC—S2 completes the circuit to the negative side of the coil EC of relay E. It should be noted that the coils EC and ST are both connected to a line J1 which feeds the impulse power from the reject push-button $a$ of Figure 1 to these coils. The energizing of the relay E operates contacts E1—E2, and E3—E4. The opening of contacts E1—E2 interrupts the circuit between the line S5 and the line J1, de-energizing the coil EC. The closing of contacts E3—E4 provides a holding circuit for the coil EC to the negative side of the power supply, so that even though contacts SC—S2 open by the action of the spring 9 when the coil ST is de-energized, the coil EC remains energized until such time when the impulse power to the line J1 is interrupted by releasing the push-button $a$. The action of the relay E insures an impulse of minimum duration to the coil ST. The operation of relays D and E is extremely rapid.

It may be desirable to provide either in the vicinity of the indicator, or at a remote point thereof, a visual and audible warning system which is set in operation when a predetermined maximum deviation from a pre-set reject level has been reached. The visual system is provided by lamps 12 and 13 while the sound system is indicated by a bell or buzzer 14. The lamp 12 is electrically connected with a segment 11 which is located upon the dial 1 and may be of the same length as the "below limit" scale. The lamp 12 may be of green color since it indicates that the actual rejects are below the pre-set level, thus showing that the quality of production is good.

A contact $11^1$ is carried by the hand 2 and is adapted to engage the segment 11 when the hand 2 is in "below limit" scale. When the contact 11 engages the segment 11 an electrical circuit will be established which will light the lamp 12.

A segment 10 is located upon the section 2' of dial 1 which indicates "above limit" and the location of the segment 10 corresponds to the maximum allowable deviation from the pre-set reject level. It is apparent that when the hand 2 is moved to the position corresponding to the maximum allowable deviation point the contact $11^1$ will engage the segment 10, thereby providing the flow of an electrical current which will illuminate the lamp 13 and energize the bell 14. The lamp 13 may be of red color.

A bell cut-out switch, not shown, may be connected to the bell 14. The brush $11^1$ may be connected by any suitable means indicated diagrammatically in Figure 3 to the positive side of a source of electrical energy of Figure 5.

A relay F may be electrically connected in parallel with segment 10 whenever it is desirable to automatically shut down the production machine or assembly line when the rejects reach a critical pre-set point. The relay F is energized at the same time that the buzzer 14 sounds a warning signal. When energized, relay F opens its contacts F1—F2, connected to lines FL1 and FL2, which are the controlling means for shutting down the production machine or assembly line.

Whenever it is desired to indicate the actual number of rejects, a counter 14' may be connected in parallel with the line J1 and the negative side of the power source. This counter operates each time the push button $a$ is depressed.

Figures 4 and 5 of the drawings illustrate the apparatus producing the impulses corresponding to the various preset reject levels which are thereupon transmitted to the indicator shown in Figure 3; Figures 4 and 5 also show the circuits of master unit M of Figure 2.

The master unit M produces impulse currents representing a straight percentage or a probability curve reject level basis and feeds the currents into the individual analyzers by a suitable plug cable CA of Figure 2.

The stepping mechanism W (Figure 4) produces impulse currents representing the allowable reject percentages. A stepper coil WC is connected to line LY of Figure 1 and to the negative side of the power source and is energized each time a unit of production PR is brought into the inspection line. At that time the unit PR passes over a roller 15 and momentarily closes contacts 16—17 (Figure 1). The coil WC becomes energized by way of the positive side of the power supply, contacts 16—17, line LY and the negative side of the power supply. The coil WC causes a pawl 18 to engage a ratchet wheel 19, which is stepped once.

In this example the ratchet 19 contains one hundred teeth in order to obtain one hundred steps per revolution. A shaft 20 is firmly connected with the ratchet 19 and rotates wafer brushes $W1^1$, $W2^1$, $W3^1$, to $W11^1$, inclusive of contact wafers W1, W2, W3 to W11. It is apparent that any suitable number of wafers can be used. The wafer W1 which represents one percent reject level has one contact WC1, connected to line 1PC, located at the 100th step of the wafer and provides the impulse currents for the one percent reject level.

The wafer W2 has two contacts WC2 jointly connected by a line 2PC located at the 50th and 100th step positions and represents two percent reject level.

The wafer W3 has contacts WC3 jointly connected to a line 3PC and located at the 33rd, 66th, and 99th step position and represents three percent reject level. Contact WCC on this wafer is utilized to energize relay G as will be described later.

The wafer W10 has ten contacts WC10 commonly connected to line 10PC and are evenly located at ten step intervals, representing ten percent reject level.

The wafers between W3 and W10 are not shown since they follow the same pattern.

The wafer W11 has one contact WC11 located one step from the zero or the 100th step position and it operates in conjunction with the probability curve stepper H which will be described herein below.

Brushes $W1^1$, $W2^1$, $W3^1$, to $W11^1$ are de-energized at the beginning of the stepping operation. This is necessary since the brushes are at the zero (actually the 100th step) position, so that they are touching the percentage contacts and would give erroneous impulse currents at the start. Brush $W3^1$ of the three percent wafer is energized since no contact is located at the 100th position.

When the first unit of production PR is brought for inspection, all of the brushes are moved once stepwise. The brush $W3^1$ engages the contact WCC and completes the circuit to coil GC of relay G (Figure 5) by way of the positive side of the power supply, the brush $W3^1$, the contact WCC, the line LX, the coil GC, and the negative side of the power supply. The energization of the relay G closes contacts G1—G2, G3—G4. The closing of contacts G1—G2 provides a holding circuit for the coil GC to the positive side of power supply. The closing of contacts G3—G4 energizes the brushes $W1^1$, $W2^1$, $W4^1$ to $W11^1$ by the line L+. As each unit of production PR comes for inspection, all of the above-mentioned brushes move stepwise one step and as they come in contact with the wafer contacts, the lines 1PC, 2PC, 3PC to 10PC are energized at intervals determined by the spacing of the contacts for the particular wafer. Thus for the one per cent wafer W1, line 1PC is energized once for every 100th unit inspected. Line 2PC is energized twice at intervals of fifty units. Lines 3PC to 10PC are energized at intervals depending upon the position of the contacts on the wafers.

Lines L1, L2, L3, to L10, which transmit the impulse currents emanating from the circuits of Figure 4, are connected to lines 1PC, 2PC, 3PC to 10PC respectively by contacts of the relay K when the system is operated on a straight percentage reject level, at which time the relay K is deenergized. The relay K is a 21 pole double-throw telephone type relay and is shown in a deenergized position in Figure 4. Line L1 is connected to line 1PC by contacts K1, $K1^{11}$, K1A, $K1A^{11}$. Line L2 is connected to line 2PC by contacts K2, $K2^{11}$, K2A, $K2A^{11}$. Line L3 is connected to line 3PC by contacts K3, $K3^{11}$, K3A, $K3A^{11}$. Line L10 is connected to line 10PC by contacts K10, $K10''$, K10A, $K10A''$. Lines between 3L and 10L are connected in a similar manner.

Lines L1 to L10 are connected by a suitable plug cable CA of Figure 2 to the selector switches of each reject analyzer as shown in Figure 6. The selector switch SL contains a zero point and ten selective points to which lines L1 to L10 are connected. A selector knob 31 rotates a brush 32 to which line LC is electrically connected. The brush 32 can engage any of the contacts 21 to 30, inclusive. The line LC is connected to a contact 33 and a segment 35 of the impulse divider 41 (Figure 7) which at this point is at the one division point. The brush 34, in this position is in contact with the contact 33 and thus completes the circuit to line L2X of Figure 3.

For the purpose of illustration, let it be assumed that on the average two of each one hundred units of production PR fail to meet the requirements for the particular characteristic inspected at station A of the inspection line shown in Figure 1. The reject level selector SL (Figure 6) of reject analyzer RA is then turned to the second position or two percent position, in which the brush 32 makes contact with the line L2 through the contact 22. As previously stated, the line L2 receives two impulse currents from the wafer W2 for every hundred units inspected. These impulse currents are transmitted to the stepper coil C (Figure 3) by way of line L2X to move the indicating hand 2 counterclockwise two steps. These represent allowable rejects for each hundred units inspected.

When a unit of production does not meet the specified requirements at station A, the inspector presses the reject push-button $a$ and, as is the general practice, a tag on the unit is marked to indicate rejection; then the unit is passed on to station B where it is checked for another characteristic. At the end of the inspection line, the production unit may be either scrapped or re-worked if it has been rejected at any of the inspection stations. The pressing of the reject push-button $a$ provides a source of power to stepper coil ST by way of the line S1 and causes the hand 2 upon the reject analyzer dial 1 to be stepped clockwise one step.

Let it be further assumed that when five hundred production units have been inspected, fourteen actual rejects have occurred. Then the equation $RD=AR-(AP \times UI)$ becomes $RD=14-(.02 \times 500)=4$, which in turn means that the coil ST has received four more impulses than coil C; therefore, the indicating hand 2 will be moved four steps clockwise to the fourth graduation in the "above limit" scale to indicate excessive rejects for station A.

If only eight actual rejects had occurred, then $RD=8-(.02 \times 500)=-2$ and the stepper coil C will have received two more impulses than the stepper coil ST and the indicating hand 2 will have moved to the second graduation in the "below limit" scale of dial 1. This indicates that the quality of production is good, since the actual rejects are below the expected reject level.

When the reject level is on a probability curve basis, the computing system computes the equation $$RD = AR - (P_1 \times I_1 + P_2 \times I_2 + P_3 \times I_3 + \ldots)$$

A sample probability curve No. 1 of $$(P_1 \times I_1 + P_2 \times I_2 + P_3 \times I_3 + \text{etc.})$$

is shown in Figure 8. The increment of inspected units $I_1$, $I_1$, etc. is taken as one hundred. Analyzing curve No. 1, the expected rejects for the first two hundred units are 3%, the next three hundred 2% and the next three hundred 1%. By using the portion of the equation $$(P_1 \times I_1 + P_2 \times I_2 + P_3 \times I_3 \text{ etc.})$$

and substituting actual values the resultant curve No. 1 of the normally expected rejects is produced.

To transform the curve No. 1 in terms of impulse currents and to transmit such currents to the stepper coil C of Figure 3, the stepper switch H of Figure 4 is used in addition to the other circuits. The stepper switch H has any suitable number of contact wafers, one for each probability curve. In Figure 4 two contact wafers HW1 and HW2 are shown by way of example, the wafer HW1 being used in connection with the probability curve No. 1. The wafers HW1 has a series of contacts HC', one for every hundred units inspected, which are wiped by a brush 36, said brush being stepped clockwise once for every hundred units inspected. As will be shown hereinafter, the first two contacts engaged by brush 36 are connected to line 3PC (3%), the next three contacts to line 2PC (2%) and the next three contacts to line 1PC (1%).

When the system is used on a probability curve basis, a switch SW is thrown to the position SW2—SW3 to energize a coil KC and actuate the relay K. Then the contacts which are shown closed in the drawings will open, and the open contacts will close. In this position, the line 3P is connected to the line 3PC through contacts K3—K3$^1$, the line 2P is connected to line 2PC through contacts K2—K2$^1$, and the line 1P is connected to line 1PC through contacts K1—K1$^1$. The line 1C, which is connected to the brush 36 and transmits the impulse currents from the contact wafer HW1 is connected to the line L1 through contacts K1A—K1A$^1$. The line 2C which is connected to the brush 37 and transmits the impulse currents from the contact wafer HW2, is connected to the line L2 through contacts K2A—K2A$^1$. Contacts K3A—K3A$^1$ to K10A—K10A$^1$ serve the same function in connection with lines 3C to 10C when ten contact wafers are used for ten probability curves. The closing of contacts K15—K15$^1$ completes the circuit necessary to energize the stepper coil HC. The stepper coil HC is energized by way of the positive side of the line supply, the brush W11$^1$, the contact WC11, the coil HC, and the negative side of the power supply. The energization of the coil HC causes the pawl 38 to engage the ratchet wheel 39 and move it in steps clockwise. Since brushes 36 and 37 are firmly connected to the ratchet wheel 39 by means of an insulated shaft 40, they also move clockwise. The wafer W11 contains one contact WC11 and is wiped by the brush W11$^1$ once after every hundred steps that said brush is rotated. Thus the coil HC is energized and the ratchet wheel 39 stepped once for every hundred production units PR inspected.

For the first two hundred units inspected, the brush 36 wipes over the first two contacts connected to the line 3P and a total of six impulse currents is transmitted to line L1; since when working on probability curve No. 1 the selector SL is in the number one position, these impulses are transmitted to the stepper coil C as previously described.

For the next three hundred units inspected, the brush 36 wipes over the next three contacts which are connected to the line 2P, so that a total of six impulse currents is transmitted to the coil C of Figure 3. During the following three hundred units inspected, the brush 36 wipes over the next three contacts connected to line 1P, so that the brush transmits a total of three impulse currents to the coil C. Therefore, when eight hundred units of production have been inspected, a grand total of fifteen impulse currents has been transmitted to the coil C to actuate the hand 2 counterclockwise. The actual number of rejects at station A provides the number of impulse currents to the coil ST to move the hand 2 clockwise. The difference in the two series of impulse currents will determine quantitively whether the actual reject level is above or below the probability curve No. 1. These quantitative deviations will show on dial 1.

The contact wafer HW2 can be connected in a similar manner to operate the reject level on a different probability curve. The selector switch SL of Figure 6 will be moved then to position number two to obtain the impulse current output of wafer HW2.

Figure 7 illustrates an impulse divider the purpose of which is to increase the selection of reject levels. This apparatus includes a stepper switch 45, relays R and CX and a divider selector 41.

The selector 41 has a dial upon which contacts B2 to B10, inclusive, are arranged. These contacts which are arranged in a circle, are used to provide a division ranging from 2 to 10. A dial 41$^1$ is located in the center of the selector 41 and may be rotated to select the division point. The dial 41$^1$ is firmly connected to an insulated arm 55 which rotates along the member 41$^1$. Brushes 34, 42, 44 are attached to the arm 55. The brush 34 is in a position in which it can move over contact 33 and segment ring 43. The brush 42 can move over a segment 35, while the brush 44 can move over any one of the contacts B2 to B10.

The stepper 45 has a dial and a toothed stepper wheel 48 which is located in the center and which carries an arm 46. The arm 46 is firmly connected to the wheel 48 and is movable therewith. The wheel 48 is actuated in one direction by a pawl 49 while a pawl 50 moves it in the opposite direction. The pawl 49 is pivoted intermediate its ends and is attracted by a coil 52. The pawl 50 is pivoted in a similar manner and is attracted by a coil 51. Two contacts 54 are located close to the pawl 49 in a position in which the pawl 49 closes the contacts 54 when the pawl 49 is attracted by the coil 52 and is moved to engage the wheel 48. Similarly, contacts 53 are closed by pawl 50 when the latter is moved by the coil 51 to engage the wheel 48.

The brush 47, which is carried by the arm 46, is connected to the plus side of a source of electrical energy. The brush or contact 47 may be moved into engagement with a number of contacts located on the dial of the stepper 45 and designated as C2 to C10 inclusive, in Figure 7.

As shown in Figure 7, these contacts are electrically connected with the contacts B2 to B10 of selector 41. The contact C2 is located two steps to the right (looking in the direction of Figure 7) of the contact CO so that the brush 47, carried by the arm 46, will engage the contact C2, after the arm 46 has been stepped clockwise 2 steps. The contact C3 is located 3 steps to the right of the contact CO, while the contact C4 is located 4 steps beyond the contact CO. Similarly, the contact C5 is located 5 steps away, the contact C6—6 steps away; the contact C7—7 steps away; the contact C8—8 steps away; the contact C9—9 steps, and the contact C10—10 steps away. As already stated, contact C2 is electrically connected to the contact B2 and represents an impulse division of 2. The contact C3 is connected with B3 and represent an impulse division of 3, and so forth.

The relay R is a 4-pole, double-throw telephone type relay, and it includes a main coil RM, used to actuate the relay. The relay is neutralized by the neutralizing coil RN. The relay includes contacts R10, R11, R12, R13, R14, R15, R21, R22, R24, R25. Figure 7 shows the relay R in its inoperative position in which the contacts R10—R11, and R13—R14 are closed while contacts R11—R12, R14—R15, R21—R22, and R24—R25 are open. When the relay R is made operative by the energization of the coil RM, the closed contacts will open while the open contacts will close.

The apparatus also includes a relay CX with an energizing coil CCX. The relay CX is made operative by energizing the coil CCX which closes the contacts C2X—C1X, and opens contacts C2X—C3X.

To illustrate the operation of the impulse divider of Figure 7, let it be assumed that a reject probability curve No. 2 is desirable whose values are one-half of curve No. 1. With the system placed on a probability curve basis, as previously described, the selector switch SL of Figure 6 is rotated to position 1, with the brush 32 engaging the contact 21, so that the switch receives the impulse currents which follow the probability curve No. 1. The selector switch 41 of the impulse divider of Figure 7 is rotated to the division position 2 in which the brush 42 engages the segment ring 35, the brush 34 engages the segment ring 43, and the brush 44 engages the contact B2. Analyzing the circuits of Figures 3, 6, and 7, it is apparent that the line LC is not connected to the line L2X through the contact 33 and the brush 44, as previously. The line LC is now in engagement with the brush 42 which has been rotated to engage the segment ring 35 to where the line LC is also connected. The line LE is connected to the brush 42, the contact R11 and to one side of the coil CCX or the relay CX. Since the relay R is in the de-energized position the contacts R11—R10 are closed and a circuit is completed to the stepper coil 51 by way of the line LC, the segment ring 35, the brush 42, the line LE, the contacts R11—R10, the line L3¹, the stepper coil 51, the line L2¹, the contacts C3X—C2X, and the negative side of the energy source. When the relay R is energized the contacts R11—R10 are open and the contacts R11—R12 are closed, thereby completing the circuit to the relay stepper 52 in a similar manner. Therefore, every time impulse currents conforming to curve No. 2 are transmitted by line LC, the stepper coil 51 or 52 will be energized.

At the beginning of the operation, the relay R is de-energized and the impulse currents transmitted by the line LC energize the coil 51, the pawl 50 is attracted, and the gear 48 as well as the arm 46 carried thereby will be moved one step clockwise.

It is apparent that the relay CX will operate at the same time, but without performing any useful work at that time.

After the second impulse has been received by the coil 51, the arm 46 has been stepped twice, so that the brush 47 carried by the arm 46, will be moved into engagement with the contact C2 upon the dial 45. As a result of the inter-engagement of contacts 47 and C2, the following will take place:

The coil C of Figure 3 will receive an electrical impulse due to the creation of a circuit, which includes the positive side of the energy source, the brush 47, the contact C2, the contact B2, the brush 44, the line L44, the rectifier RX7, the contacts R13—R14, the line L45, the segment ring 43, the brush 34 which is in engagement with the segment ring 43, the line L2X, the contacts D1—D2 of Figure 3, the coil C, and the negative side of the energy source. The relay D is also energized and contacts D1—D2 open to de-energize stepper coil C, contacts D5—D6 close to complete the circuit to the coil RM of the relay R by way of the positive side of the energy source, the brush 47, the contact C2, the contact B2, the brush 44, the line L44, the coil RM, the rectifier RX6, the line L3X, contacts D5—D6, and the negative side of the energy source. Contacts D5—D6 insure that the stepping operation of the pawl 4 of Figure 3 is completed before energizing the relay R. At the same time, the coil CCX of the relay CX will be energized, since it is connected to the line LE.

Due to the energization of the coil CCX the contacts C3X—C2X will open while the contacts C2X—C1X will be closed. As a result of the closing of the contacts C2X—C1X, the coil CCX will remain energized although the contacts 53 will open.

The opening of the contacts C3X—C2X will open the common return to the negative side of the energy source of the stepper coils 51 and 52. Due to this arrangement, no reversal of the direction of the arm 46 can take place during the duration of one impulse. Without this provision an incorrect movement of the arm 46 in the opposite direction could occur.

When the relay R is made operative by the energization of the coil RM, the contacts of the relay R, shown open in Figure 7, will close, and the closed contacts will be opened.

As a result of the closing of the contacts R21—R22 and the contacts R24—R25, the positive and the negative sides of the energy source will be connected directly to the coil RM so as to provide a holding circuit. The contacts R13—R14 will open the energy source to line L2X and coil DC of relay D will be de-energized. The contacts R10—R11 will open the circuit of the stepper coil 51. On the other hand, the contacts R11—R12 will close to form a circuit which will include the coil 52. Therefore, on the next impulse from the line LC, the arm 46 will move counter-clockwise.

It is thus apparent that the circuits will be set up in such manner that when the line LC is energized on the next impulse current, the stepper coil 52 will be energized by means of a circuit which includes the line LC, the segment ring 35, the brush 42, the line LE, the contacts R11—R12, the line L1¹, the coil 52, the line L2¹, the contacts C3X—C2X, and the negative side of the energy source. Then the stepper coil 52 will attract the stepper pawl 49 and cause it to engage the toothed wheel 48, as a result of which the arm 46 will move one step counter-clockwise.

The relay CX will be operated in the manner previously described.

After two impulse currents are transmitted by the line LC to the coil 52, the arm 46 will move counter-clockwise two steps so that the brush 47, carried by the arm 46, will be moved back into engagement with the contact CO. As soon as the brush 47 engages the contact CO, the following operation will take place:

One more impulse will be emitted to the stepper coil C of the apparatus of Figure 3, as a result of an electrical circuit which includes the positive side of the energy source, the brush 47, the contact CO, the rectifier RX5, contacts R15—R14, the line L45, the segment ring 43, the brush 34, the line L2X, the contacts D1—D2 of Figure 3, the coil C and the negative side of the energy source. Coils DC (Figure 3) and CCX (Figure 7) are also energized as previously described.

When the relay D operates, the relay R will be made inoperative since an electrical circuit will be established through its neutralizing coil RN by way of the positive side of the energy source, the contact CO, the coil RN, the line L3X, the contacts D6—D5 (Figure 3), and the negative side of the energy source. Then the contacts of relay R will assume the initial position shown in Figure 7 so that the arm 46 can move clockwise in the previously described manner.

It is therefore apparent that as a result of the described operations the arm 46 will be stepped clockwise two times, and then reverses its direction of movement so that it will be stepped counter-clockwise two times whereupon its direction of movement is again reversed. For every two impulse currents transmitted by the circuits of Figure 4 and conforming to curve No. 1, one impulse will be transmitted to the stepper coil C of the analyzer indicator 1 of Figure 3, so that the hand 2 of this indicator will be moved counter-clockwise one step. Therefore, for every two impulses that conform to curve No. 1, one impulse is transmitted to the coil C of indicator 1 to conform to curve No. 2, which represents the desired probability reject level.

It is apparent that if a curve equalling to one-third of curve No. 1 is desirable, selector switch 41 is rotated to position 3, and it will be necessary for the arm 46 to be stepped three times before its direction of movement is reversed and one impulse will be transmitted to the coil C of Figure 3 for every three steps or for every three impulses that follow curve No. 1.

It is also apparent that while the function of the impulse divider has been described in connection with a probability curve, it also can be utilized to divide any reject level percentages, and that various other modifications and variations may be made in the described apparatus without exceeding the scope of the present invention. All such modifications and variations are to be included within the scope of the present invention.

What is claimed is:

1. A computing and indicating system for showing deviations from a control limit, comprising, a first counting device emitting a first series of impulses, a second counting device emitting a second series of impulses, an impulse divider mechanism operatively connected with the first-mentioned counting device and emitting a third series of impulses conforming to a pre-set control limit, an indicator for showing the difference between two series of impulses, means operatively connecting said impulse divider mechanism with said indicator, and means operatively connecting the second-mentioned counting indicator with said device, whereby said indicator is actuated by a difference between the second and third series of impulses.

2. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said selector being adjustable to transmit a selected portion of said first series of electrical impulses conforming to a pre-set control limit to said indicator, and a device connected with said indicator and emitting a second series of electrical impulses, whereby said indicator is actuated by a difference between said selected portion of the first series of impulses and said second series of impulses.

3. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said master unit receiving said first series of impulses from said counting device and transmitting a percentage of said impulses to said indicator, said selector having means for varying said percentage; and a device connected with said indicator and emitting a second series of electrical impulses, whereby said indicator is actuated by a difference between said percentage of the first series of the impulses and said second series of impulses.

4. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said master unit receiving said first series of impulses from said counting device and transmitting a percentage of said impulses to said indicator, said selector having means manually varying said percentage; and a device connected with said indicator and emitting a second series of electric impulses, whereby said indicator is actuated by a difference between said percentage of the first series of the impulses and said second series of impulses.

5. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said master unit receiving said first series of impulses from said counting device and transmitting a percentage of said impulses, said indicator means automatically varying said percentage in the course of the emission of said first series of electrical impulses; and a device connected with said indicator and emitting a second series of electrical impulses, whereby said indicator is actuated by a difference between said percentage of the first series of the impulses and said second series of impulses.

6. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said master unit receiving said first series of impulses from said counting device and transmitting a selected percentage of said impulses to said indicator, said selector having means automatically varying said percentage in the course of the emission of said first series of electrical impulses and a switch for switching on and off the last-mentioned means; and a device connected with said indicator and emitting a second series of electrical impulses, whereby said indicator is actuated by a difference between said percentage of the first series of the impulses and said second series of impulses.

7. A computing and indicating system for showing deviations from a control limit, said system comprising a counting device emitting a first series of electrical impulses, a master unit connected with said counter, a selector connected with said master unit, an indicator showing the difference between two series of electrical impulses and connected with said master unit, said master unit receiving said first series of impulses from said counting device and transmitting a percentage of said impulses to said indicator, said selector having means automatically varying said percentage in the course of the emission of said first series of electrical impulses, an impulse divider connected with the last-mentioned means for reducing to a selected fraction said percentage; and a device connected with said indicator and emitting a second series of electrical impulses, whereby said indicator is actuated by a difference between said fraction of the percentage of the first series of the impulses and said second series of impulses.

8. In a computing and indicating system for showing deviations from a control limit, a master unit having a stepper mechanism, said stepper mechanism comprising a stepper coil, means connected with said coil for energizing it intermittently by a series of electrical impulses, a pawl actuated by said coil, a shaft, a ratchet wheel firmly connected with said shaft and stepped by said pawl, a plurality of wafer brushes connected with said shaft and rotatable therewith, a plurality of wafers having wafer contacts adapted to be engaged by said brushes, the number and location of said contacts corresponding to the number of percentages to which said stepper mechanism may be set, and means connected with said brushes and contacts for transmitting a set percentage of said series of electrical impulses.

9. In a computing and indicating system for showing deviations from a control limit, the combination of a master unit having a stepper mechanism, said stepper mechanism comprising a stepper coil, means connected with said coil for energizing it intermittently by a series of electrical impulses, a pawl actuated by said coil, a shaft, a ratchet wheel firmly connected with said shaft and stepped by said pawl, a plurality of wafer brushes connected with said shaft and rotatable therewith, a plurality of wafers having wafer contacts adapted to be engaged by said brushes, the number and location of said contacts corresponding to the number of percentages to which said stepper mechanism may be set, a relay, means connected with one of said contacts and said relay for energizing said relay when said ratchet wheel is stepped once from a zero position, and means connecting said relay with said brushes for energizing said brushes when said relay is energized; and a reject analyzer having a selector switch comprising a plurality of switch contacts, and a brush adapted to selectively engage any of said switch contact; means connecting said wafer contacts with said switch contacts, and means connected with said brush for transmitting a percentage of said series of electrical impulses which is determined by the position of said brush.

10. In a computing and indicating system for showing deviations from a control limit, the combination of a master unit having a stepper mechanism, said stepper mechanism comprising a stepper coil, means connected with said coil for energizing it intermittently by a series of electrical impulses, a pawl actuated by said coil, a shaft, a ratchet wheel firmly connected with said shaft and stepped by said pawl, a plurality of wafer brushes connected with said shaft and rotatable therewith, a plurality of wafers having wafer contacts adapted to be engaged by said brushes, the number and location of said contacts corresponding to the number of percentages to which said stepper mechanism may be set, a relay, means connected with one of said contacts and said relay for energizing said relay when said ratchet wheel is stepped once from a zero position, and means connecting said relay with said brushes for energizing said brushes when said relay is energized; another relay having a plurality of relay contacts connected with said wafer contacts, a relay coil and a switch for actuating said relay coil; and a probability-curve stepper switch comprising a number of contact wafers corresponding to the number of probability curves, a plurality of contacts carried by the last-mentioned wafers, the number and location of said contacts corresponding to said probability curves, some of said relay contacts being connected with the last-mentioned contacts when said relay is actuated, a ratchet wheel operatively connected with the last-mentioned wafers, a stepper coil operatively connected to one of the first-mentioned contacts, and a pawl actuated by the last-mentioned stepper coil to step the last-mentioned ratchet wheel, whereby the stepping of the last-mentioned ratchet wheel is dependent upon the turning of the first-mentioned ratchet wheel, and means connected with said other relay for transmitting variable percentages of said series of electrical impulses corresponding to said probability curves.

11. A system in accordance with claim 10, comprising a selector switch, means connecting said selector switch to the last-mentioned means, and means connecting said selector switch with the last-mentioned contacts, whereby said selector switch is operable to select the probability curve followed by said series of electrical impulses.

12. In a computing and indicating system for showing deviations from a control limit, an impulse divider, comprising a stepper switch having a dial, a toothed stepper wheel in the center of said dial, an arm rotatable along with said stepper wheel, two pawls adaptable to actuate said stepper wheel in opposite directions, stepper coils actuating said pawls, a plurality of contacts upon said dial and a brush carried by said arm and adapted to engage said contacts; a divider selector comprising a plurality of contacts connected with the first-mentioned contacts and constituting different division points, a dial rotatable to a plurality of positions, a brush carried by said dial and adapted to engage the last-mentioned contacts, a segment, means supplying electrical impulses following a probability curve to said segment, another brush carried by said dial and adapted to engage said segment, means connecting said brushes with said stepper coils for oscillating said arm with an amplitude depending upon the location of said dial, and means transmitting an electrical impulse once for each completed oscillation of said arm.

13. An impulse divider in accordance with claim 12, wherein the last-mentioned means comprise a relay having contacts and a main coil for actuating the last-mentioned contacts, means connecting the last-mentioned contacts with said stepper coils for energizing one stepper coil when the relay is energized and for energizing the other stepper coil when the relay is deenergized, and means connected with the contacts of the divider selector for operating the last-mentioned means in conformity with the location of the second-mentioned dial.

14. In a computing and indicating system for showing deviations from a control limit, in combination with an impulse divider comprising a stepper switch having a dial, contacts upon said dial, a rotary wheel, an arm rotatable along with said wheel means actuating said wheel in opposite directions, and a brush carried by said arm and adapted to engage said contacts; a divider selector comprising a plurality of contacts connected with the first-mentioned contacts and constituting different division points, a dial rotatable to a plurality of positions, a brush carried by the last-mentioned dial and adapted to engage the last-mentioned contacts, a segment, means supplying electrical impulses following a probability curve to said segment, another brush carried by the last-mentioned dial and adapted to engage said segment, means connecting the second-mentioned brush and the third-mentioned brush with the first-mentioned means for oscillating said arm with an amplitude depending upon the location of the last-mentioned dial, a relay, means connecting said relay with the first-mentioned means for actuating said wheel in one direction when the relay is energized and for actuating said wheel in the opposite direction when the relay is deenergized, and means connected with the second-mentioned contacts for actuating the last-mentioned means in conformity with the location of the second-mentioned dial.

15. In a computing and indicating system for showing deviations from a control limit, in combination with an impulse divider comprising a stepper switch having a dial, contacts upon said dial, a rotary wheel, an arm rotatable along with said wheel means actuating said wheel in opposite directions, and a brush carried by said arm and adapted to engage said contacts; a divider selector comprising a plurality of contacts connected with the first-mentioned contacts and constituting different division points, a dial rotatable to a plurality of positions, a brush carried by the last-mentioned dial and adapted to engage the last-mentioned contacts, a segment, means supplying electrical impulses to said segment, another brush carried by the last-mentioned dial and adapted to engage said segment, means connecting the second-mentioned brush and the third-mentioned brush with the first-mentioned means for oscillating said arm with an amplitude depending upon the location of the last-mentioned dial, a relay, means connecting said relay with the first-mentioned means for actuating said wheel in one direction when the relay is energized and for actuating said wheel in the opposite direction when the relay is deenergized, and means connected with the second-mentioned contacts for actuating the last-mentioned means in conformity with the location of the second-mentioned dial.

References Cited in the file of this patent

UNITED STATES PATENTS

| 2,283,993 | Holtz et al. | May 26, 1942 |
| 2,419,583 | McDavitt | Apr. 29, 1947 |
| 2,556,374 | Koechel | June 12, 1951 |
| 2,656,528 | Savino | Oct. 20, 1953 |

FOREIGN PATENTS

| 435,624 | Great Britain | Sept. 25, 1935 |